(12) United States Patent
Sakano

(10) Patent No.: US 10,917,593 B2
(45) Date of Patent: Feb. 9, 2021

(54) CAMERA CALIBRATION DEVICE THAT ESTIMATES INTERNAL PARAMETER OF CAMERA

(71) Applicant: CLARION CO., LTD., Saitama (JP)

(72) Inventor: Morihiko Sakano, Tokyo (JP)

(73) Assignee: CLARION CO., LTD., Saitama (JP)

( * ) Notice: Subject to any disclaimer, the term of this patent is extended or adjusted under 35 U.S.C. 154(b) by 329 days.

(21) Appl. No.: 16/071,422

(22) PCT Filed: Dec. 1, 2016

(86) PCT No.: PCT/JP2016/085737
§ 371 (c)(1),
(2) Date: Jul. 19, 2018

(87) PCT Pub. No.: WO2017/134915
PCT Pub. Date: Aug. 10, 2017

(65) Prior Publication Data
US 2020/0304737 A1 Sep. 24, 2020

(30) Foreign Application Priority Data
Feb. 3, 2016 (JP) ................... 2016-018717

(51) Int. Cl.
*H04N 5/217* (2011.01)
*H04N 5/357* (2011.01)
*G06T 7/80* (2017.01)

(52) U.S. Cl.
CPC ............. *H04N 5/3572* (2013.01); *G06T 7/80* (2017.01); *G06T 2207/30252* (2013.01)

(58) Field of Classification Search
CPC ................ H04N 5/3572; G06T 7/80; G06T 2207/30252
(Continued)

(56) References Cited

U.S. PATENT DOCUMENTS

2008/0309763 A1* 12/2008 Hongo ................. G06T 3/00
348/148
2012/0323473 A1 12/2012 Irie et al.
(Continued)

FOREIGN PATENT DOCUMENTS

JP      2000-268179 A    9/2000
JP      2003-256806 A    9/2003
(Continued)

OTHER PUBLICATIONS

Li Mingyang et al: "High-fidelity sensor modeling and self-calibration in vision-aided inertial navigation", 2014 IEEE International Conference on Robotics and Automation (ICRA), IEEE, May 31, 2014(May 31, 2014), pp. 409-416 (Year: 2014).*
(Continued)

*Primary Examiner* — Usman A Khan
(74) *Attorney, Agent, or Firm* — Foley & Lardner LLP

(57) ABSTRACT

This camera calibration device is provided with: an image acquisition unit into which a plurality of images captured at different times by a camera mounted to a vehicle are inputted; a feature point extraction unit which extracts features points from each of the images inputted into the image acquisition unit; a feature point tracking unit which tracks the feature points between the plurality of images; a vehicle movement acquisition unit which acquires information related to the movement of the vehicle; a trajectory estimation unit which, on the basis of the information acquired by the vehicle movement acquisition unit, estimates the trajectory of the feature points corresponding to the movement of the vehicle; and an internal parameter estimation unit which estimates internal parameters of the camera on the basis of the trajectory of the feature points tracked by the feature point tracking unit, and the trajectory
(Continued)

of the feature points estimated by the trajectory estimation unit.

6 Claims, 11 Drawing Sheets

(58) Field of Classification Search
USPC .......................................................... 348/241
See application file for complete search history.

(56) References Cited

U.S. PATENT DOCUMENTS

| 2013/0236107 | A1 | 9/2013 | Fukaya et al. | |
|---|---|---|---|---|
| 2014/0133699 | A1* | 5/2014 | Guan | G06K 9/00798 |
| | | | | 382/103 |
| 2014/0139674 | A1 | 5/2014 | Aoki et al. | |
| 2016/0180176 | A1* | 6/2016 | Yamamoto | G06T 7/269 |
| | | | | 382/103 |
| 2016/0275683 | A1* | 9/2016 | Sakano | B60R 1/00 |

FOREIGN PATENT DOCUMENTS

| JP | 2006-195790 A | 7/2006 |
|---|---|---|
| JP | 2011-185753 A | 9/2011 |
| JP | 2011-189803 A | 9/2011 |
| JP | 2013-186816 A | 9/2013 |
| JP | 2014-101075 A | 6/2014 |

OTHER PUBLICATIONS

Li Mingyang et al: "High-fidelity sensor modeling and self-calibration in vision-aided inertial navigation", 2014 IEEE International Conference on Robotics and Automation (ICRA), IEEE, May 31, 2014(May 31, 2014), pp. 409-416.

Supplementary European Search Report issued in corresponding European Patent Application No. 16889398.0 dated Sep. 18, 2019.

International Search Report with English translation and Written Opinion issued in corresponding application No. PCT/JP2016/085737 dated Feb. 21, 2017.

* cited by examiner

| FEATURE POINT | CAPTURING TIME AND COORDINATES | | | | | STATE | AREA | POLYNOMIAL APPROXIMATION |
|---|---|---|---|---|---|---|---|---|
| | t1 | t2 | t3 | t4 | t5 | | | |
| 1001 | (x11,y11) | (x12,y12) | (x13,y13) | x | — | OK | (C) | y=2x^5+8x^4+... |
| 1002 | (x21,y21) | (x22,y22) | (x23,y23) | (x24,y24) | (x25,y25) | UNFINISHED | (B), (D) | NOT YET CALCULATED |
| 1003 | . | (x31,y31) | (x32,y32) | (x33,y33) | x | NO PAIR | . | y=−5x^3+... |
| 1004 | . | (x41,y41) | (x42,y42) | (x43,y43) | x | MISMATCH | . | . |
| . | . | . | . | . | . | . | . | . |

CAMERA CALIBRATION DEVICE THAT ESTIMATES INTERNAL PARAMETER OF CAMERA

TECHNICAL FIELD

The present invention relates to a camera calibration device.

BACKGROUND ART

In recent years, mounting of a camera to an automobile as a safeguard is advancing. The camera is used in various applications such as provision of a surrounding overhead image to a driver, prevention of road departure, output of an alarm based on recognition of a pedestrian and another automobile, and collision avoidance and contributes to improvement in safety and convenience of the automobile. To calculate a positional relationship between the camera and the object in these applications, external parameters and internal parameters of the camera are required.

The external parameters are parameters representing a relationship between the vehicle and the camera such as parameters representing a mounting position and a posture of the camera with respect to the vehicle. The internal parameters are parameters related to optical systems in the camera such as parameters representing a focal length and distortion of a lens. At the time of production of the lens, a parameter related to the distortion is measured in advance, and the measurement result can be used as the internal parameter. However, the distortion characteristics of the lens change as the chassis of the in-vehicle camera expands and shrinks due to changes of the in-vehicle temperature and heat generation of the board. That is, using as it is the internal parameter derived in advance causes a problem. For example, in a case in which a distance to the object is calculated with use of an image captured by the camera and the internal parameter, a non-negligible error occurs in the distance. For this reason, calibration for the internal parameter while the vehicle is moving is required.

PTL 1 discloses a camera calibration device which estimates an internal parameter with use of a white line on a road.

CITATION LIST

Patent Literature

PTL 1: JP 2011-185753 A

SUMMARY OF INVENTION

Technical Problem

In the invention described in PTL 1, calibration for the internal parameter cannot be performed without the white line on the road.

Solution to Problem

According to a first aspect of the present invention, a camera calibration device includes: an image acquisition unit into which a plurality of images captured at different times by a camera mounted to a vehicle is input; a feature point extraction unit which extracts feature points from each of the images input into the image acquisition unit; a feature point tracking unit which tracks the feature points between the plurality of images; a vehicle movement acquisition unit which acquires information about movement of the vehicle; a trajectory estimation unit which, based on the information acquired by the vehicle movement acquisition unit, estimates a trajectory of the feature points corresponding to the movement of the vehicle; and an internal parameter estimation unit which estimates an internal parameter of the camera based on at least one trajectory of the feature points tracked by the feature point tracking unit and the trajectory of the feature points estimated by the trajectory estimation unit.

Advantageous Effects of Invention

According to the present invention, calibration for an internal parameter can be performed even without a white line on a road.

BRIEF DESCRIPTION OF DRAWINGS

FIG. 3 illustrates an example of tracking point information 102A.

DESCRIPTION OF EMBODIMENTS

First Embodiment

Hereinbelow, a first embodiment of a camera calibration device according to the present invention will be described with reference to FIGS. 1 to 9.

Figure 1:
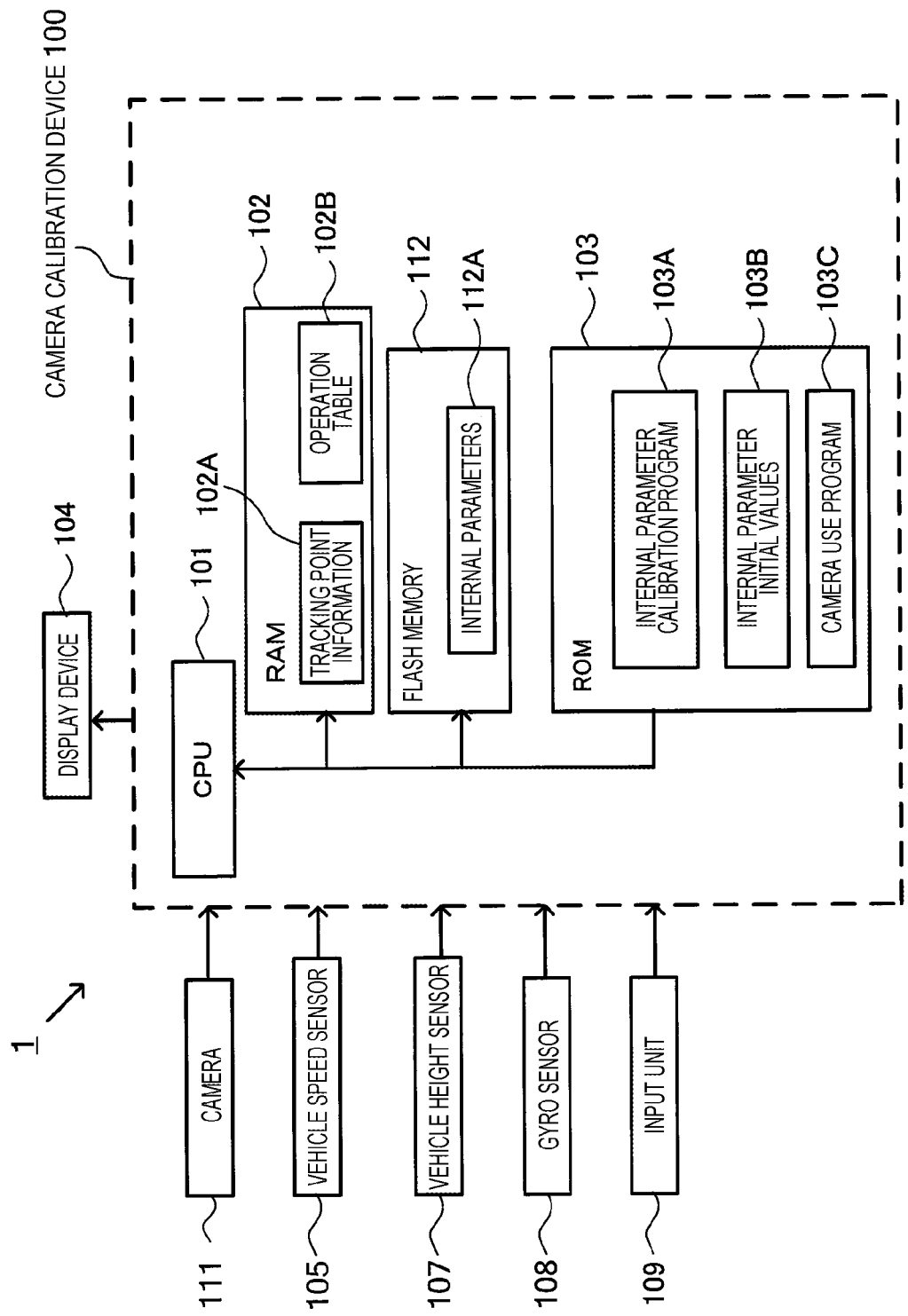
FIG. 1 is a block diagram illustrating a configuration of a vehicle 1 including a camera calibration device 100.

FIG. 1 is a block diagram illustrating configurations of a camera calibration device 100 according to the present invention and a vehicle 1 including the camera calibration device 100.

The vehicle 1 includes the camera calibration device 100, a camera 111 which captures a front of the vehicle 1, a display device 104 which provides a driver with information based on an output of the camera calibration device 100, a vehicle speed sensor 105 which measures speed of the vehicle 1, a vehicle height sensor 107 which measures a height of the vehicle 1 to the ground, a gyro sensor 108 which measures triaxial angular velocity of the vehicle 1, and an input unit 109 which lets the driver perform an input operation. Information acquired by the camera 111, the vehicle speed sensor 105, the vehicle height sensor 107, the gyro sensor 108, and the input unit 109 is transmitted to the camera calibration device 100.

The present embodiment will be described below on the assumption that a gradient of a road which the vehicle 1 contacts is constant, and that a gradient of a road at least in a range captured by the camera 111 corresponds to the gradient of the road which the vehicle 1 grounds. That is, description will be provided below on the assumption that the vehicle 1 is moving on a broad horizontal surface or in the middle of a slope having a constant gradient.

The camera 111 is mounted to the front of the vehicle 1, and the optical axis is set to face further downward than the horizontal direction at the front of the vehicle 1. Information about a position and a posture of the camera 111 with respect to the vehicle 1 is stored in a below-mentioned flash memory 112 as external parameters. Since the mounting state of the camera 111 to the vehicle 1 inevitably changes, the external parameters are corrected as needed by a known calibration method. The camera 111 includes a lens and an imaging element, and characteristics of these parts such as a lens distortion coefficient serving as a parameter representing distortion of the lens, a center of an optical axis, a focal length, and the number of pixels and dimensions of the imaging element are stored in a ROM 103 as internal parameter initial values. Also, internal parameters including a lens distortion coefficient calculated by a below-mentioned calibration program are stored in the flash memory 112.

The camera calibration device 100 includes a CPU 101 which performs calculation, a RAM 102, the ROM 103, and the flash memory 112.

The CPU 101 is connected to the RAM 102, the ROM 103, and the flash memory 112 by means of signal lines. The CPU 101 develops a program stored in the ROM 103 in the RAM 102 and executes the program.

The RAM 102 has stored therein tracking point information 102A used by a below-mentioned program and an operation table 102B. A structure of the tracking point information 102A will be described below. The operation table 102B is one obtained by partially copying and processing the tracking point information 102A and is prepared by below-mentioned processing.

The ROM 103 has stored therein an internal parameter calibration program 103A, internal parameter initial values 103B, a camera use program 103C, and not-illustrated external parameter initial values. The operation of the internal parameter calibration program 103A will be described below with reference to a flowchart. The camera use program 103C is a program which uses the camera 111. For example, the camera use program 103C calculates a distance to a surrounding vehicle with use of an image captured by the camera 111, and in a case in which the distance is equal to or shorter than a predetermined distance, the camera use program 103C displays an alarm on the display device 104. The camera use program 103C requires external parameters and internal parameters of the camera 111 for execution and reads these parameters from the flash memory 112. However, in a case in which no external parameters and internal parameters are stored in the flash memory 112, the camera use program 103C uses the internal parameter initial values 103B and the external parameter initial values stored in the ROM 103.

The flash memory 112 is a non-volatile storage medium and has stored therein internal parameters 112A including the lens distortion coefficient output by the internal parameter calibration program 103A and not-illustrated external parameters.

The input unit 109 includes switches and buttons and receives operations of a user. The input unit 109 is used to turn on/off the calibration function, initialize the calibration result, change the calibration method, and the like.

(Functional Blocks and Overview of Processing)

Figure 2:
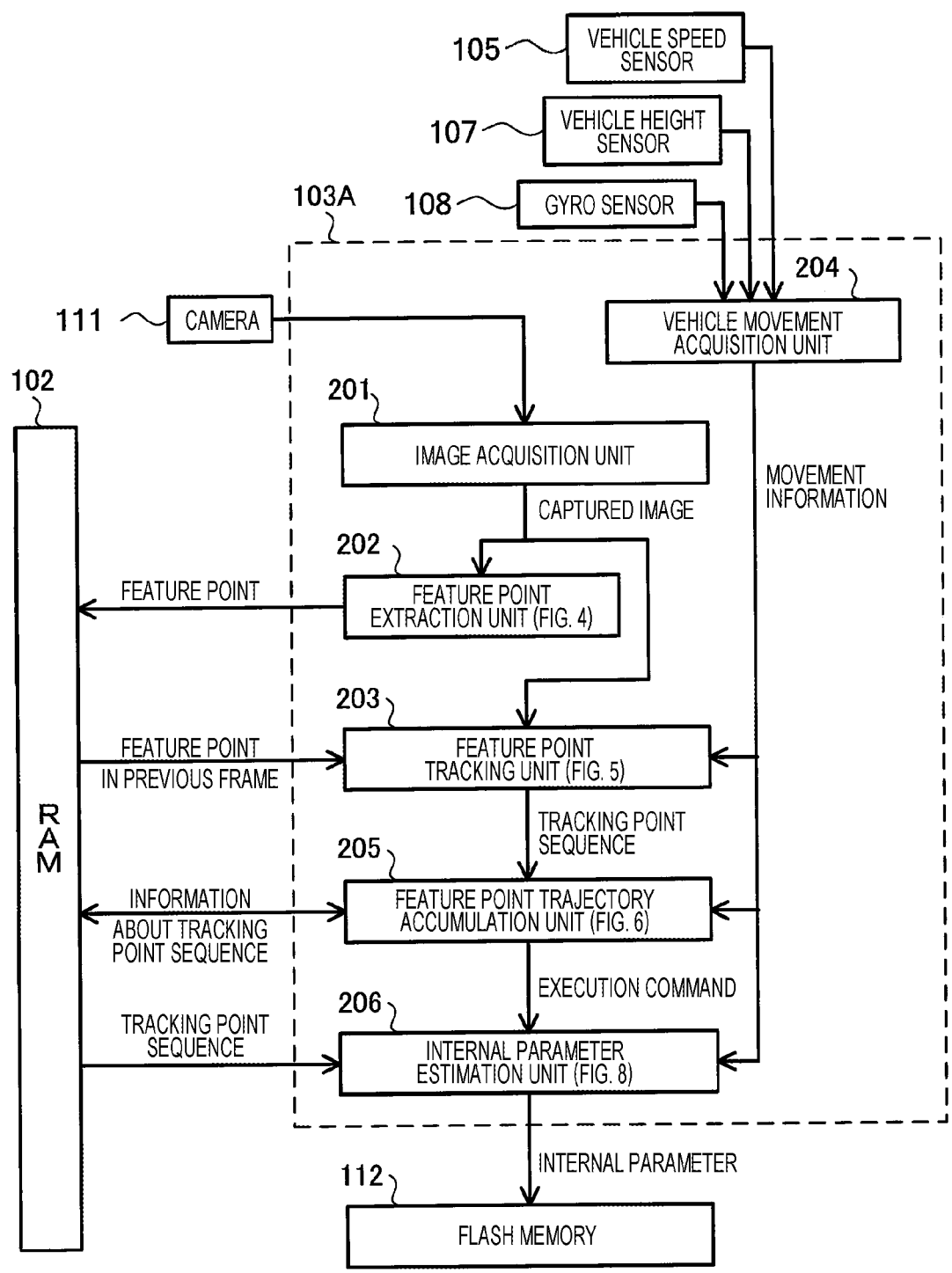
FIG. 2 is a functional block diagram of an internal parameter calibration program.

FIG. 2 illustrates functional blocks representing functions of the internal parameter calibration program 103A executed by the CPU 101 and data flows between the functional blocks and between the functional blocks and the RAM 102.

The internal parameter calibration program 103A includes as functional blocks an image acquisition unit 201, a feature point extraction unit 202, a feature point tracking unit 203, a vehicle movement acquisition unit 204, a feature point trajectory accumulation unit 205, and an internal parameter estimation unit 206. The image acquisition unit 201, the feature point extraction unit 202, and the feature point tracking unit 203 are executed each time the camera 111 captures an image.

While the vehicle 1 is moving, the camera 111 successively captures images with high frequency, e.g., 60 times per second. An image captured by the camera 111 (hereinbelow, a captured image) is transmitted to the camera calibration device 100.

The image acquisition unit 201 receives the captured image from the camera 111 and outputs the received captured image to the feature point extraction unit 202 and the feature point tracking unit 203. While the vehicle 1 is moving, the camera 111 successively captures images with high frequency, e.g., 60 times per second, and each time the image acquisition unit 201 receives the captured image from the camera 111, in other words, each time the captured image is input from the camera 111, the image acquisition unit 201 outputs the received captured image to the feature point extraction unit 202 and the feature point tracking unit 203.

The feature point extraction unit 202 performs image processing to the captured image input from the image acquisition unit 201 to extract feature points. The feature points mentioned here are intersection points of edges such as a corner of a wall, a corner of a curb, and a corner of a dashed line in the image, that is, corner feature points. The corner feature points can be extracted by applying Harris operator, which is a known technique, for example. The feature points extracted by the feature point extraction unit 202 can be specified by coordinates in the captured image of the camera 111, for example. In the present embodiment, as illustrated in FIG. 7(b), with an upper left of the captured image as an origin point, the right direction from the origin point is defined as a positive direction of the X axis while the downward direction from the origin point is defined as a positive direction of the Y axis. The feature points extracted by the feature point extraction unit 202 are stored in the RAM 102.

The feature point tracking unit 203 performs tracking processing for feature points acquired from the most recent captured image and read from the RAM 102 with use of the most recent captured image input from the image acquisition unit 201 and movement information input from the vehicle movement acquisition unit 204. In tracking of feature points, known tracking methods such as SAD (Sum of Absolute Difference), SSD (Sum of Squared Difference), and LK (Lucas-Kanade) can be used. The feature point tracking unit 203 then outputs information about the tracked feature points to the feature point trajectory accumulation unit 205.

The vehicle movement acquisition unit 204 calculates movement information about the vehicle 1, such as a movement trajectory and speed of the vehicle 1, based on outputs of the vehicle speed sensor 105 and the gyro sensor 108 and outputs the movement information to the feature point tracking unit 203 and the feature point trajectory accumulation unit 205.

The feature point trajectory accumulation unit 205 stores a trajectory of the feature points acquired from the feature point tracking unit 203 in the tracking point information 102A of the RAM 102. At this time, an erroneous feature point trajectory is eliminated, only a reliable feature point trajectory is kept, a trajectory which improves calibration accuracy is selected, and the like.

The internal parameter estimation unit 206 estimates a lens distortion coefficient with use of the tracking point information 102A which the feature point trajectory accumulation unit 205 has stored in the RAM 102 and writes the lens distortion coefficient in the flash memory 112. At this time, the internal parameter estimation unit 206 reads internal parameters except the lens distortion coefficient from the ROM 103 and writes the internal parameters in the flash memory 112 as well as the lens distortion coefficient.

FIG. 3 illustrates an example of the tracking point information 102A stored in the RAM 102. In FIG. 3, the rows represent individual feature points while the columns represent coordinates of the feature points on the captured images at capturing times t1 to t5, a state of each feature point trajectory, an area which each feature point trajectory belongs to, and an approximate expression of each feature point trajectory. These will be described in order.

The numbers given to the feature points such as 1001 and 1002 are numbers given in order of extraction. FIG. 3 shows that two feature points are extracted from the captured image captured at the time t1, that four feature points are extracted from the captured images captured at the times t2 and t3, respectively, that three feature points are extracted from the captured image captured at the time t4, and that one feature point is extracted from the captured image captured at the time t5. FIG. 3 shows that two of the four feature points extracted from the captured images at the times t2 and t3, respectively, that is, feature point 1001 and feature point 1002, have continuously been tracked since the time t1. Feature point 1001 is not extracted from the captured image captured at the time t4, and the "x" mark is thus put in FIG. 3. It is to be noted that, although only the times t1 to t5 are displayed in the example illustrated in FIG. 3, the number of times is not limited to this.

The column "state" in the tracking point information 102A is referred to when whether or not the feature points are used for calibration for the internal parameter is determined. In this column, "unfinished" is written in a case in which tracking of the feature point is being continued, "mismatch" is written in a case in which movement of the vehicle 1 and the feature point trajectory do not match, "no pair" is written in a case in which there exist no other similar feature point trajectories, and "OK" is written in the other cases. In the column "area" in the tracking point information 102A, an area which each feature point trajectory belongs to is written. In the column "polynomial approximation" in the tracking point information 102A, an expression for each feature point trajectory approximated by a polynomial is written.

Hereinbelow, processing performed by each functional block will be described with use of a flowchart. An actor of each flowchart described below is the CPU 101 of the camera calibration device 100.

(Operations of Feature Point Extraction Unit)

Figure 4:
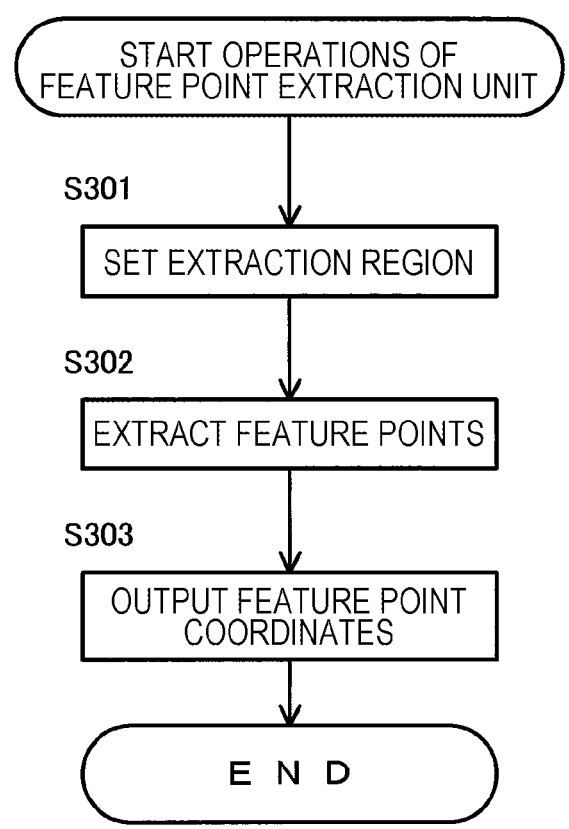
FIG. 4 is a flowchart illustrating operations of a feature point extraction unit 202.

FIG. 4 is a flowchart illustrating operations of the feature point extraction unit 202. The feature point extraction unit 202 executes the following operations each time a captured image is transmitted from the image acquisition unit 201.

In step S301, a region in the captured image from which the feature point extraction unit 202 extracts feature points is determined based on a traveling direction of the vehicle 1 and a capturing direction of the camera 111 with respect to the traveling direction of the vehicle 1. For example, in a case in which the vehicle 1 moves forward, and in which the camera 111 is mounted to the front of the vehicle 1, feature points located close to the vehicle 1 will disappear out of the viewing angle of the camera 111 immediately after they are extracted, and the period in which they can be tracked is short. The load for calculation processing in such an unnecessary region is required to be reduced for real time calculation processing since it takes longer time for calculation processing in a broader processing region. For this reason, a processing region is set so that feature points away from the vehicle may be extracted. Conversely, in a case in which the camera 111 is mounted to capture an image of the backside of the vehicle, a processing region close to the vehicle is set when the vehicle moves forward. Subsequently, the procedure moves to step S302.

In step S302, feature points are extracted from the feature point extraction region set in step S301. It is especially preferable to extract corner feature points, which are intersection points of edges. Corner feature points are extracted from the region set in step S301 by applying the Harris operator or the like, and the procedure then moves to step S303.

In step S303, coordinates of the feature points extracted in step S302 are output to the RAM 102 to end the flowchart in FIG. 4.

(Operations of Feature Point Tracking Unit)

Figure 5:
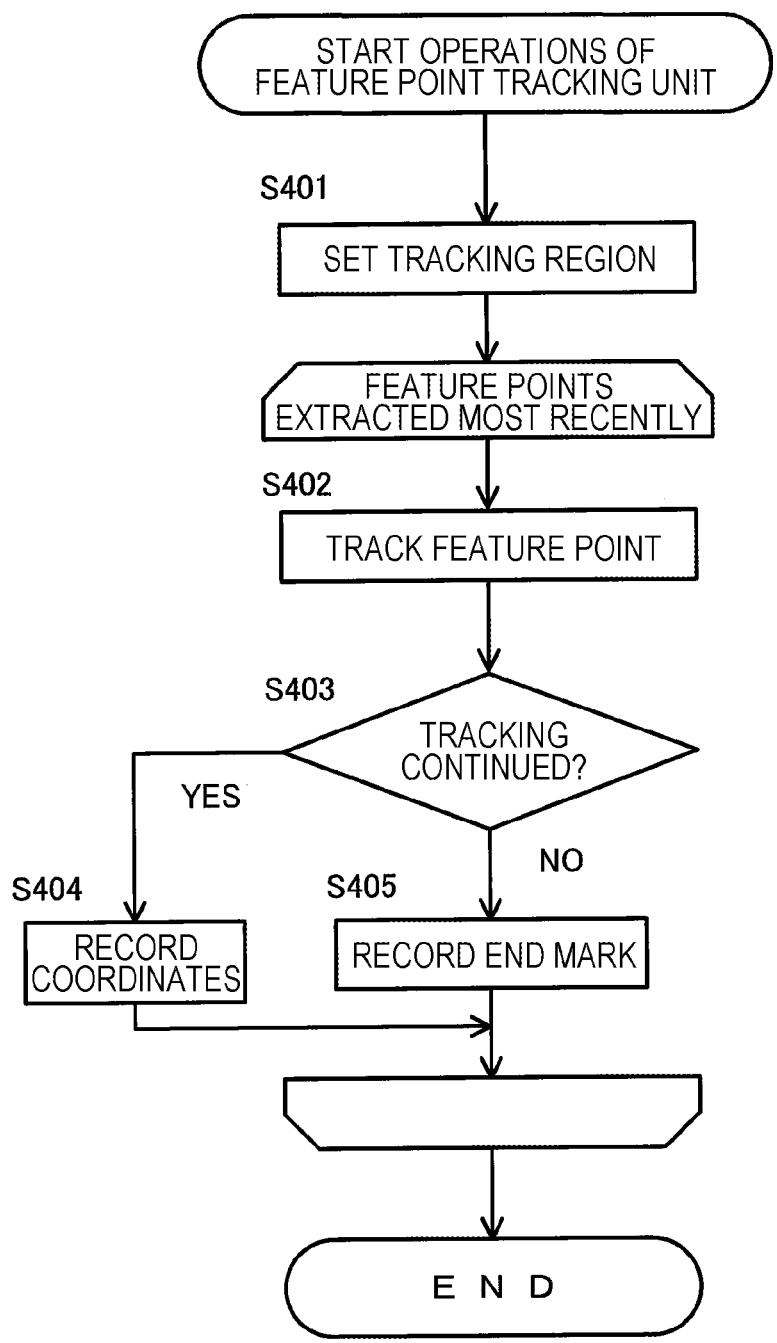
FIG. 5 is a flowchart illustrating operations of a feature point tracking unit 203.

FIG. 5 is a flowchart illustrating operations of the feature point tracking unit 203. The feature point tracking unit 203 executes the following operations each time a captured image is transmitted from the image acquisition unit 201.

In step S401, a processing region for tracking processing of feature points is set. That is, a direction and a distance in/at which feature points extracted from a captured image captured by the camera 111 most recently are estimated with use of the coordinates of the feature points extracted by the feature point extraction unit 202 and the movement information of the vehicle 1 acquired by the vehicle movement acquisition unit 204. A region corresponding to the estimated direction and the estimated distance in/at which the feature points move is determined as a region in the captured image in which the feature point tracking unit 203 tracks the feature points. The procedure then moves to step S402. It is to be noted that the captured image used to estimate the direction and the distance in/at which the feature points move is not limited to the most recent captured image, and the estimation may be performed with use of a plurality of captured images or a captured image other than the most recent captured image. In other words, the direction and the distance in/at which the feature points move are estimated with use of captured images captured earlier.

Steps S402 to S405 described below are repetitively executed as many times as the number of feature points extracted from the most recent captured image.

In step S402, a feature point in the most recent captured image read from the RAM 102, which is a tracking target, is tracked by means of a known method such as the SAD and the LK described above, and the procedure then moves to step S403.

In step S403, whether or not the tracking of the feature point in the most recent captured image, which is a tracking target, has been continued is determined. For example, in a case in which the matching degree in the SAD or the like is equal to or lower than a predetermined threshold value, it is determined that the tracking has not been performed because the feature point has disappeared out of the viewing angle of the camera or because of another reason. In a case in which it is determined that the tracking has been continued, the procedure then moves to step S404. In a case in which it is determined that the tracking has not been continued, the procedure then moves to step S405.

In step S404, coordinates of the tracked feature point is recorded in a cell in a row of the targeted feature point and in a column of time at which the targeted captured image is captured in the tracking point information 102A.

In step S405, a mark representing an end of tracking, such as the "x" mark, is recorded in a cell in the row of the targeted feature point and in the column of the time at which the targeted captured image is captured in the tracking point information 102A.

When execution of step S404 or step S405 is completed, whether or not all of the feature points extracted from the most recent captured image have undergone steps S402 to S405 is determined. In a case in which there are unfinished feature points, the procedure returns to step S402. In a case in which it is determined that processing of all of the feature points is completed, the flowchart in FIG. 5 ends.

(Operations of Feature Point Trajectory Accumulation Unit)

Figure 6:
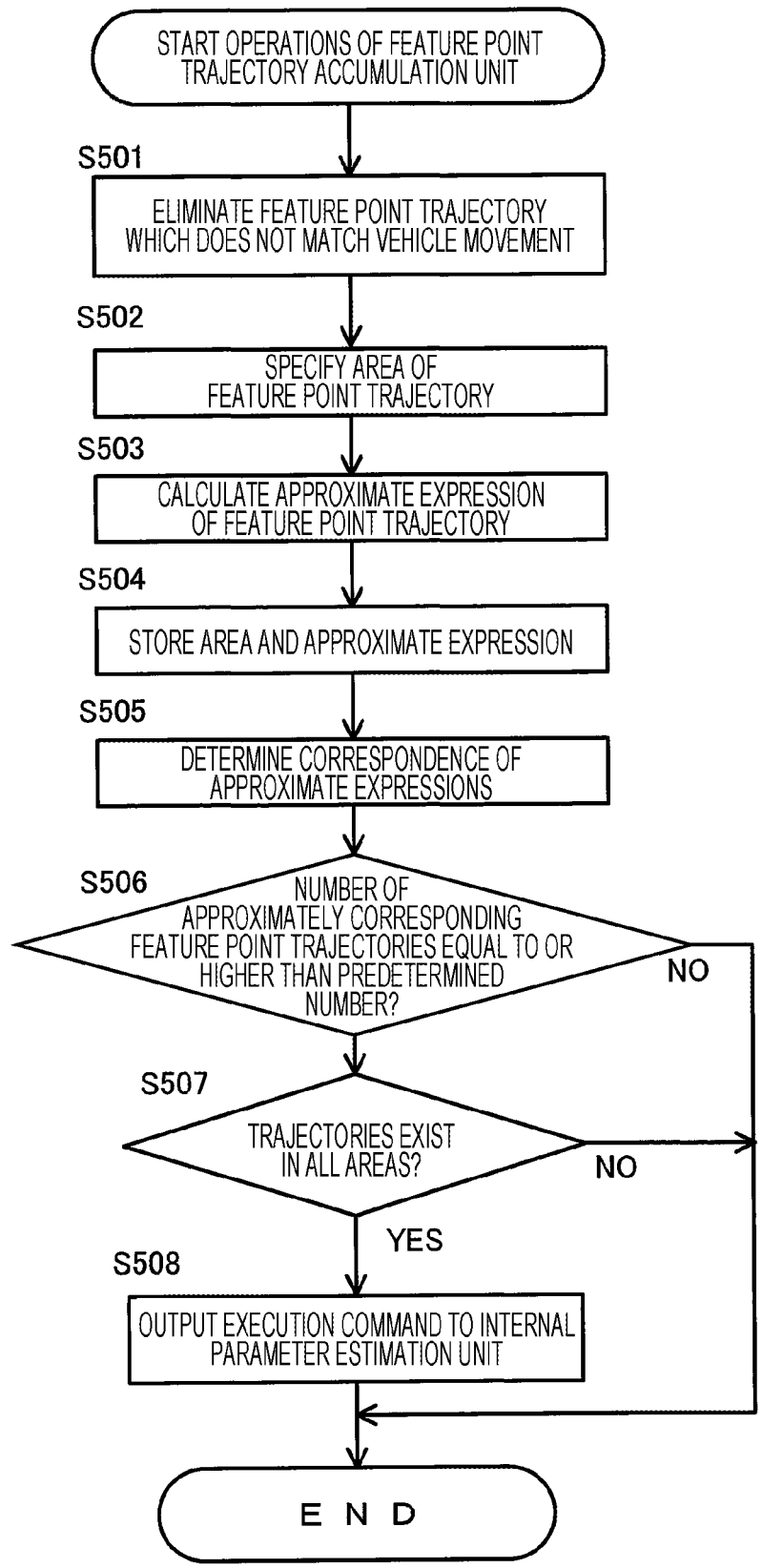
FIG. 6 is a flowchart illustrating operations of a feature point trajectory accumulation unit 205.

FIG. 6 is a flowchart illustrating operations of the feature point trajectory accumulation unit 205.

In step S501, the tracking point information 102A is read from the RAM 102, and "mismatch" is recorded in a cell in a row of a feature point trajectory which does not match movement information output by the vehicle movement acquisition unit 204 and in the column "state". For example, in a case in which the feature point trajectory stays although the vehicle is moving at 60 km per hour, or in a case in which the trajectory heads in an opposite direction of the traveling direction, it can be determined that the trajectory is not a trajectory of feature points on the road. In tracking feature points in image processing, erroneous tracking is inevitable due to changes of the sunshine conditions, changes of the weather, the shadows of the subject car and other cars, and the like. In a case in which erroneous tracking results are used in calibration, correct calibration cannot be performed. Hence, such tracking results are eliminated in the processing in step S501. The procedure then moves to step S502.

In step S502, an area which the respective feature points extracted by the feature point extraction unit 202 belong to, that is, an area which the feature point trajectory belongs to, is specified. As described below, the captured image captured by the camera 111 is divided into a plurality of areas. In this step, which area the feature point trajectory belongs to is specified. In a case in which the feature point trajectories for use in the estimation of the internal parameter exist only in a part of the captured image, the estimation accuracy for the internal parameter is lowered. Thus, it is preferable to perform the calibration after the feature points are obtained over the entire image. For this reason, which area in the captured image the feature point trajectory belongs to is determined in this processing.

Figure 7A:
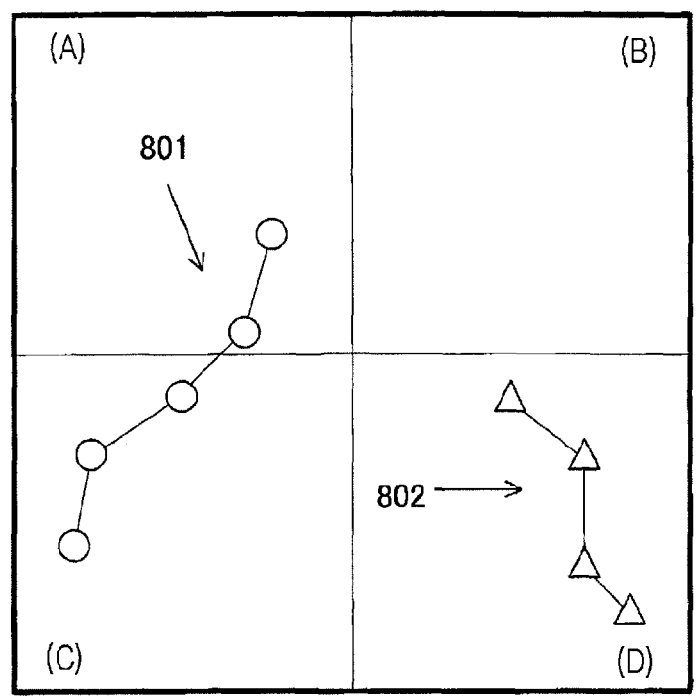
FIG. 7(a) illustrates an example of areas in an image which feature point trajectories belong to, and FIG. 7(b) illustrates an example in which line segments connecting tracked feature points are approximated by one curve.
Figure 7B:
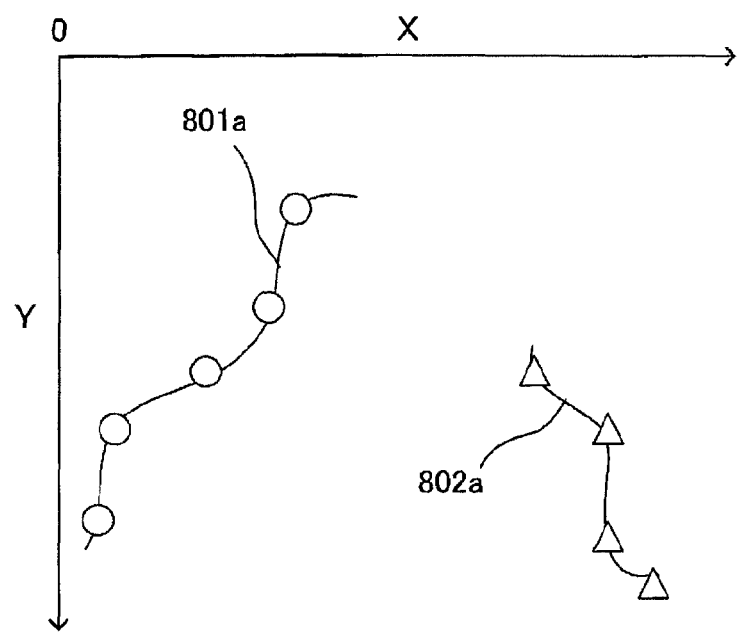

FIG. 7(a) is an example illustrating areas in the captured image which the feature point trajectories belong to. In this example, suppose that a first feature point trajectory 801 expressed by the round markers and a second feature point trajectory 802 expressed by the triangular marks are stored in the tracking point information 102A. For example, the captured image of the camera 111 is divided into four areas, (A) to (D), as in FIG. 7(a). At this time, the feature point trajectory 801 belongs to the area (A) and the area (C), and the feature point trajectory 802 belongs to the area (D). That is, in the example illustrated in FIG. 7(a), no feature point trajectory that belongs to the area (B) exists. Note that the feature point trajectory means a line segment into which tracked feature points are connected by straight lines. The procedure then moves to step S503.

In step S503, the plurality of straight lines connecting the tracked feature points is approximated by one polynomial. For example, the straight lines are approximated by a pentanomial expressed by Expression (1) shown below to derive parameters a to e.

$$Y = ax^5 + bx^4 + cx^3 + dx^2 + ex + f \tag{1}$$

FIG. 7(b) illustrates an example in which the line segments connecting the tracked feature points are approximated by one curve. The feature point trajectories illustrated in FIG. 7(b) are equal to the feature point trajectories illustrated in FIG. 7(a). In FIG. 7(b), the feature point trajectory 801 expressed by the plurality of line segments is approximated by one curve 801a, and similarly, the feature point trajectory 802 is approximated by one curve 802a. The procedure then moves to step S504.

In step S504, the areas which the respective feature point trajectories belong to calculated in step S502 and the polynomials approximating the feature point trajectories calculated in step S503 are stored in the tracking point information 102A, and the procedure then moves to step S505.

In step S505, whether or not there exist approximately corresponding approximate expressions to each other in approximate expressions recorded in the tracking point information 102A is determined. In a case in which there exist other approximately corresponding polynomials, "OK" is written in the column "state" in the tracking point information 102A. In a case in which there exist no other corresponding polynomials, "no pair" is written. The procedure then moves to step S506.

Whether or not polynomials approximately correspond can be determined by whether or not the difference between coefficients in the polynomials is within a predetermined value. For example, suppose that two feature point trajectories are approximated by the following expressions (2) and (3), respectively.

$$Y = a_1 x^5 + b_1 x^4 + c_1 x^3 + d_1 x^2 + e_1 x + f_1 \tag{2}$$

$$Y = a_2 x^5 + b_2 x^4 + c_2 x^3 + d_2 x^2 + e_2 x + f_2 \tag{3}$$

At this time, in a case in which all of $(a_1-a_2)<\text{th\_a}$, $(b_1-b_2)<\text{th\_b}$, $(c_1-c_2)<\text{th\_c}$, $(d_1-d_2)<\text{th\_d}$, $(e_1-e_2)<\text{th\_e}$, and $(f_1-f_2)<\text{th\_f}$ are satisfied, it is determined that the two feature point trajectories approximately correspond. Note that th_a, th_b, th_c, th_d, th_e, and th_f are predetermined threshold values.

In step S506, the tracking point information 102A is referred to, and whether or not the number of approximately corresponding feature point trajectories is equal to or higher than a predetermined number. In other words, whether or not the number of "OKs" in the column "state" in the tracking point information 102A is equal to or higher than a predetermined number is determined. In a case in which it is determined that the condition is satisfied, the procedure moves to step S507. In a case in which it is determined that the condition is not satisfied, the procedure illustrated in FIG. 6 ends.

In step S507, the tracking point information 102A is referred to, and whether or not each of the areas includes at least one feature point trajectory is determined with reference to cells in the column "area" whose column "state" is "OK" in the tracking point information 102A. That is, in this step, whether or not the feature point trajectories for use in the estimation of the internal parameter are distributed in a wide range in the captured image of the camera 111 is determined. In a case in which it is determined that the condition is satisfied, the procedure moves to step S508. Ina case in which it is determined that the condition is not satisfied, the procedure illustrated in FIG. 6 ends.

In step S508, an execution command is output to the internal parameter estimation unit 206 to end the procedure illustrated in FIG. 6.

(Operations of Internal Parameter Estimation Unit)

Figure 8:
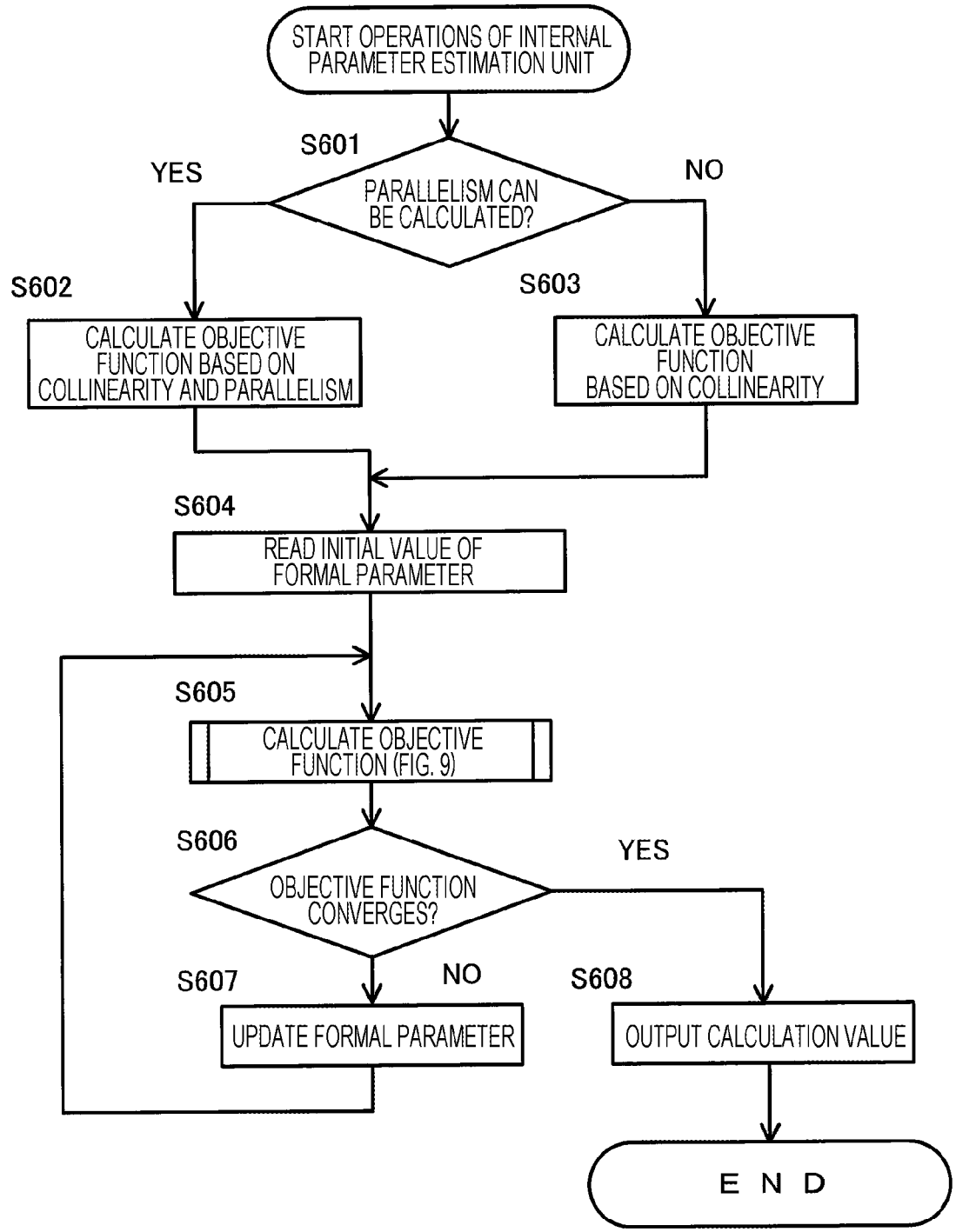
FIG. 8 is a flowchart illustrating operations of an internal parameter estimation unit 206.
Figure 9:
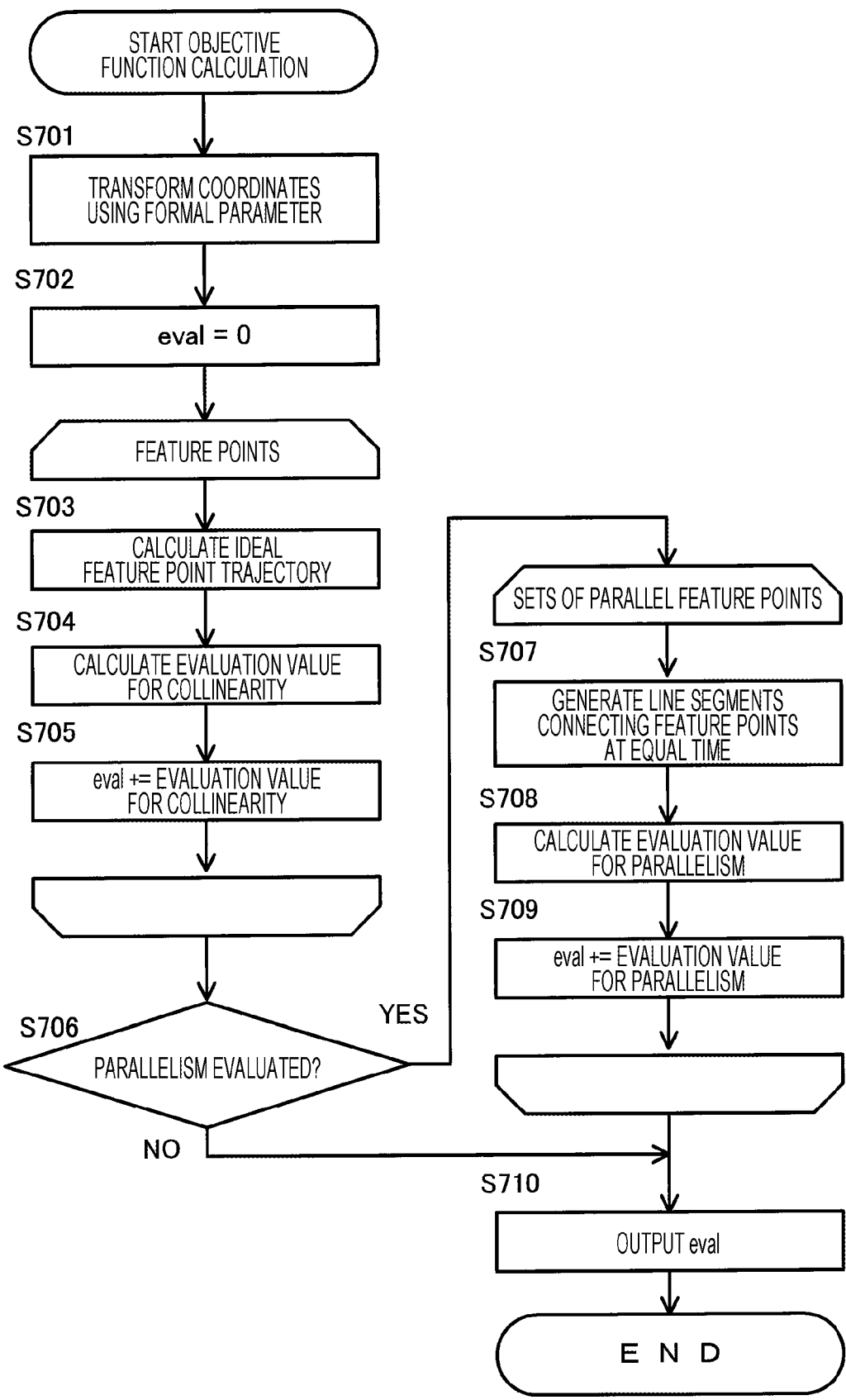
FIG. 9 is a subroutine illustrating detailed processing in step S605 in FIG. 8.

FIG. 8 is a flowchart illustrating operations of the internal parameter estimation unit 206. When the internal parameter estimation unit 206 receives an execution command from the feature point trajectory accumulation unit 205, the internal parameter estimation unit 206 starts operations. In this flowchart, a lens distortion coefficient minimizing a below-mentioned objective function is derived by iterative calculation. In FIG. 8 and FIG. 9 described below, a lens distortion coefficient temporarily set in an iterative calculation procedure is referred to as "a formal parameter".

In step S601, it is determined whether or not there exist sets of feature points enabling an evaluation for parallelism in a feature point trajectory recorded in the tracking point information 102A and having "OK" in the column "state", that is, whether or not there exist one or more sets of feature points whose coordinates Y are approximately equal in a plurality of successive captured images. In a case in which it is determined that there exist feature points satisfying the conditions, the procedure moves to step S602. In a case in which it is determined that there exist no feature points satisfying the conditions, the procedure moves to step S603.

In step S602, the below-mentioned objective function is calculated based on collinearity and parallelism, and the procedure then moves to step S604.

In step S603, which is executed in a case of the negative determination in step S601, it is determined that the below-mentioned objective function is to be calculated based only on collinearity, and the procedure then moves to step S604.

In step S604, the lens distortion coefficient in the internal parameters 112A stored in the flash memory 112 is read as a formal parameter. However, in a case in which no internal parameters 112A are stored in the flash memory 112 at the time of initial execution or the like, the internal parameter initial value 103B is read from the ROM 103. The procedure then moves to step S605.

In step S605, the objective function is calculated with use of the formal parameter, the movement information output by the vehicle movement acquisition unit 204, and the feature point trajectories stored in the tracking point information 102A from the viewpoint determined in step S602 or step S603. That is, the objective function based on the collinearity and the parallelism or the objective function based only on the collinearity is calculated. The detail thereof will be described with reference to FIG. 9. In this step, a scalar value, which is an evaluation value for the objective function, is obtained. The procedure then moves to step S606.

In step S606, whether or not the objective function has converged, that is, whether or not the difference between the previous objective function and the present objective function is equal to or lower than a predetermined value is determined. In a case in which it is determined that the objective function has converged, the procedure moves to step S608. In a case in which it is determined that the objective function has not converged, the procedure moves to step S607. However, at the time of initial execution, it is impossible to determine whether or not the objective function has converged. In this case, negative determination is performed in this step.

In step S607, the formal parameter is updated, and the procedure returns to step S605. For example, by using the known Levenberg-Marquardt Method or the like, the formal parameter can be updated to decrease the objective function.

In step S608, a parameter when the objective function converges is output to end the processing illustrated in FIG. 8.

(Flowchart of Calculation of Objective Function)

FIG. 9 is a subroutine illustrating detailed processing in step S605 in FIG. 8.

In step S701, a feature point trajectory recorded in the tracking point information 102A and having "OK" in the column "state" is copied as the operation table 102B in the RAM 102. Also, the coordinates of the feature points described in the operation table 102B are transformed, using the formal parameter. In the subsequent steps in the flowchart illustrated in FIG. 9, calculation is performed with use of the feature points after coordinate transform described in the operation table 102B. The procedure then moves to step S702.

In step S702, zero is substituted in a variable eval serving as an evaluation value for the objective function to initialize the variable, and the procedure then moves to step S703.

Steps S703 to S705 described below are executed for each of the feature points described in the operation table 102B.

In step S703, with the coordinate point of the targeted feature point at the earliest time as a start point, an ideal feature point trajectory in accordance with the movement of the vehicle 1 based on the movement information is calculated. The ideal feature point trajectory is a feature point trajectory in a case in which the camera 111 has no lens distortion, that is, a feature point trajectory in a case in which an effect of lens distortion of the camera 111 has completely been eliminated by the internal parameter. For example, in a case in which it is determined that the vehicle 1 is moving straight based on the movement information output by the vehicle movement acquisition unit 204, it can be estimated that an ideal feature point trajectory is a straight line. On the other hand, in a case in which it is determined that the vehicle 1 is not moving straight but turning based on the movement information, a trajectory of feature points on the road captured by the camera 111 is calculated with use of the external parameters of the camera 111 and the movement information. The procedure then moves to step S704.

In step S704, with use of the ideal trajectory calculated in step S703 and the trajectory described in the operation table 102B, an evaluation value for collinearity is calculated. In the present embodiment, since the objective function is intended to be minimum, the evaluation value for collinearity is set to be lower as the distance between the ideal trajectory and the trajectory described in the operation table 102B is shorter. For example, the evaluation value for collinearity is the sum of the distances between the ideal trajectory and the respective feature point coordinates described in the operation table 102B. The procedure then moves to step S705.

In step S705, the evaluation value for collinearity calculated in step S704 is added to the variable eval. In a case in which execution of steps S703 to S705 is completed for all of the feature points described in the operation table 102B, the procedure moves to step S706. In a case in which there are feature points for which the execution is not completed, the procedure returns to step S703.

In step S706, whether or not parallelism is to be evaluated, that is, whether or not the positive determination has been provided in step S601, is determined. In a case of the positive determination, the procedure moves to step S707. In a case of the negative determination, the procedure moves to step S710.

Steps S707 to S709 described below are executed for sets of the feature points determined to be parallel in the operation table 102B.

In step S707, for the feature points determined to be parallel, line segments connecting feature point coordinates at an equal time are generated, and the procedure then moves to step S708.

In step S708, parallelism of the plurality of line segments generated in step S707 is evaluated in consideration of the movement information of the vehicle 1. In the present embodiment, since the objective function is intended to be minimum, the evaluation value for parallelism is set to be higher as the line segments are less parallel. For example, the evaluation value is a value derived by subtracting the rotation angle of the vehicle from the angle between the line segments. The procedure then moves to step S709.

In step S709, the evaluation value for parallelism calculated in step S708 is added to the variable eval. In a case in which execution of steps S707 to S709 is completed for all of the sets of the parallel feature points described in the operation table 102B, the procedure moves to step S710. In a case in which there are feature points for which the execution is not completed, the procedure returns to step S707.

In step S710, the variable eval is output as a value for the objective function, and the operation table 102B is deleted from the RAM 102, to end the flowchart in FIG. 9.

According to the above first embodiment, the following effects can be obtained.

(1) The camera calibration device 100 includes the image acquisition unit 201 into which a plurality of images captured at different times by the camera 111 mounted to the vehicle 1 is input, the feature point extraction unit 202 which extracts feature points from each of the images input into the image acquisition unit 201, the feature point tracking unit 203 which tracks the feature points between the plurality of images, the vehicle movement acquisition unit 204 which acquires information about movement of the vehicle, a trajectory estimation unit (step S703 in FIG. 9) which, based on the information acquired by the vehicle movement acquisition unit 204, estimates a trajectory of the feature points corresponding to the movement of the vehicle 1, and the internal parameter estimation unit 206 which estimates an internal parameter of the camera 111, that is, a lens distortion coefficient serving as a parameter representing lens distortion, based on a trajectory of the feature points tracked by the feature point tracking unit 203 and the trajectory of the feature points estimated by the trajectory estimation unit.

Since the camera calibration device 100 is configured as above, feature points are extracted from road signs or the like drawn on the road, and calibration for the lens distortion coefficient is performed. In other words, since lines, symbols, and letters drawn on the road are used, calibration for the lens distortion coefficient can be performed even without a white line on the road.

(2) The internal parameter includes a lens distortion coefficient in accordance with distortion of a lens included in the camera 111. The internal parameter estimation unit 206 calculates the lens distortion coefficient so that a difference between a trajectory of the feature points into which the trajectory of the feature points tracked by the feature point tracking unit 203 has been transformed with use of the lens distortion coefficient (step S701 in FIG. 9) and the trajectory of the feature points estimated by the trajectory estimation unit (step S703 in FIG. 9) may be minimum.

That is, by estimating positions of the feature points extracted from road signs drawn on a road in captured images of the camera 111 with use of movement information of the vehicle 1, the lens distortion coefficient of the camera 111 can be estimated.

(3) The camera calibration device 100 includes a trajectory approximation unit which approximates the trajectory of the feature points tracked by the feature point tracking unit 203 with use of a polynomial (step S503 in FIG. 6) and a correspondence determination unit which, based on a difference between a coefficient of a polynomial which the trajectory approximation unit uses to approximate a first feature point trajectory and a coefficient of a polynomial which the trajectory approximation unit uses to approximate a second feature point trajectory, determines whether or not the first feature point trajectory and the second feature point trajectory correspond (step S505 in FIG. 6). The internal parameter estimation unit 206 estimates the lens distortion coefficient of the camera 111 with use of the first feature point trajectory and the second feature point trajectory which are determined to correspond by the correspondence determination unit.

In a case in which similar feature point trajectories are acquired, this means that the feature point trajectories are not trajectories of noises but trajectories of road signs on a road and are reliable. Thus, by using the feature point trajectories having approximately equal approximate expressions, the lens distortion coefficient of the camera 111 can be calculated with high accuracy.

(4) The internal parameter estimation unit 206 estimates the internal parameter of the camera 111 in a case in which the trajectories of the feature points tracked by the feature point tracking unit 203 are included in all areas into which the image is divided (step S507 in FIG. 6).

In a case in which the feature point trajectories exist only in a part of the captured image, information about distortion of the entire lens surface is not acquired, and sufficient calibration accuracy cannot be obtained.

Accordingly, by executing estimation of the internal parameter on condition that the feature points are distributed in a wide range of the captured image, lowering of calibration accuracy is prevented.

(5) In a case in which it is determined that the vehicle 1 is moving straight based on the movement information, the internal parameter estimation unit 206 estimates that the trajectory of the feature points is a straight line.

Thus, only in a case in which the vehicle 1 is moving straight, calibration for the internal parameter can be performed without using external parameters.

(6) In a case in which it is determined that the vehicle 1 is not moving straight based on the movement information, the internal parameter estimation unit 206 estimates the feature point trajectory with use of the external parameters of the camera 111 and the movement information acquired by the vehicle movement acquisition unit 204.

Thus, even in a case in which the vehicle 1 is turning, calibration for the internal parameter can be performed with use of the external parameters of the camera 111 and the movement information.

(7) The feature point extraction unit 202 determines a region in the image from which the feature points are extracted based on a traveling direction of the vehicle 1 and a capturing direction of the camera 111 with respect to the traveling direction of the vehicle 1.

Thus, since the feature points are extracted for the purpose of tracking, and a region that could not be tracked soon even if the region was extracted is thus eliminated from the processing region, the load of the feature point extraction unit 202 can be reduced. The feature point extraction unit 202 executes processing each time the camera 111 captures an image and is required to finish processing before the camera 111 captures the following image. For this reason, in a case in which the load of the feature point extraction unit 202 increases, the processing capability of the CPU 101 of the camera calibration device 100 is required to be raised. In other words, by reducing the load of the feature point extraction unit 202, an inexpensive product with low processing capability can be used as the CPU 101 of the camera calibration device 100.

(8) With use of a position at which a feature point is extracted by the feature point extraction unit 202 in a first image captured at an earlier time out of the plurality of images and the information acquired by the vehicle movement acquisition unit 204, the feature point tracking unit 203 determines a region in which the feature point is tracked in a second image captured at a later time than the first image out of the plurality of images.

Thus, the processing region of the feature point tracking unit 203 can be limited, and the load of the feature point tracking unit 203 can be reduced. The feature point tracking unit 203 executes processing each time the camera 111 captures an image and is required to finish processing before the camera 111 captures the following image. For this reason, in a case in which the load of the feature point tracking unit 203 increases, the processing capability of the CPU 101 of the camera calibration device 100 is required to be raised. In other words, by reducing the load of the feature point tracking unit 203, an inexpensive product with low processing capability can be used as the CPU 101 of the camera calibration device 100.

First Modification Example

In the above first embodiment, only the feature points for which the feature point tracking unit 203 has completed tracking, that is, only the feature points which cannot be tracked in the following captured image and which are marked with "x" in the tracking point information 102A, are used for calibration for the internal parameter. However, feature points for which tracking has not been completed may be used for calibration for the internal parameter.

Second Modification Example

In the above first embodiment, the vehicle 1 has only one camera 111. However, the vehicle 1 may have a plurality of cameras. In a case in which the vehicle 1 has a plurality of cameras, as many camera calibration devices 100 as the number of the cameras may be provided, or only one camera calibration device 100 may be provided and may calibrate the internal parameters of the plurality of cameras sequentially.

Meanwhile, the internal parameter calibration program 103A described in the first embodiment can be applied regardless of the mounting position and the capturing direction of the camera mounted in the vehicle.

Third Modification Example

In a case in which a CMOS sensor is used for an imaging element of the camera 111, and in which a rolling shutter method is employed for the shutter, the captured image is distorted in a case in which the relative speed between the camera 111 and an object is high. In this case, the camera calibration device 100 may further include a distortion compensation unit which corrects the captured image in the following manner, and the feature point extraction unit 202 and the feature point tracking unit 203 may perform processing with use of the captured image corrected by the distortion compensation unit.

The CMOS sensor includes a plurality of photodiodes arranged in a matrix form, and the photodiodes are sequentially exposed and read per row. The difference in the per-row exposure and readout time is known, and movement information of the vehicle 1 mounting the camera 111 is acquired by the vehicle movement acquisition unit 204. Based on the difference in the per-row exposure and readout time of the CMOS sensor, the movement information of the vehicle 1, and the external parameters of the camera 111, the distortion compensation unit eliminates distortion from the captured image of the camera 111 and outputs the captured image to the feature point extraction unit 202 and the feature point tracking unit 203.

According to the third modification example, distortion of the captured image resulting from the readout method of the CMOS sensor can be eliminated without including a mechanical shutter.

Fourth Modification Example

In the above first embodiment, a gradient of a road which the vehicle 1 contacts is constant. However, the present invention can be applied to a case in which a gradient of a road in a range captured by the camera 111 does not correspond to the gradient of the road which the vehicle contacts. The present invention can be applied to this case by estimating the gradient of the road in the capturing range against the posture of the vehicle 1 and considering an effect of the changes of the gradient of the road on the position of the feature point trajectory in the captured image in the processing of calculating the ideal feature point trajectory (step S703 in FIG. 9).

As a means for estimating the gradient of the road in the capturing range against the posture of the vehicle 1, a position and a direction of the vehicle 1 acquired by a satellite positioning system and map information including information about road gradients can be combined, and a linear object existing along the road such as a white line and a guardrail, a horizontal edge of a building along the road, an inclination of another vehicle moving on the road, and the like can be used.

Fifth Modification Example

In the above first embodiment, the calibration for the internal parameter is executed at all times. However, the calibration may be executed only in a case in which conditions of temperature and time are satisfied.

For example, the vehicle 1 may further include a thermometer, and the thermometer may record a temperature when the calibration for the internal parameter is executed. In a case in which the temperature changes as much as or more than predetermined degrees such as five degrees, the calibration for the internal parameter may be executed again. In this case, the temperature measured by the thermometer may be a temperature of the camera 111, an outside temperature, or a temperature in an occupant compartment of the vehicle 1. Alternatively, the calibration for the internal parameter may be executed at predetermined intervals.

Sixth Modification Example

In the above first embodiment, in step S502 in FIG. 6, the captured image is divided into four areas, and which area the feature point trajectory belongs to is determined. However, the number of divided areas and the dividing method are not limited to these. The number of divided areas may be at least two. The image may not be divided in a matrix form but may be divided only in the X direction or in the Y direction. Also, each area may not be in a rectangular shape but may be in a circular shape, in an indefinite shape, or in a random manner.

Seventh Modification Example

In the above first embodiment, one of conditions to operate the internal parameter estimation unit 206 is a condition in which at least one feature point trajectory exists in each of the areas in the captured image (step S507 in FIG. 6). However, the number of the feature point trajectories in the condition is not limited to one and may be two or three or more.

Second Embodiment

A second embodiment of a camera calibration device according to the present invention will be described with reference to FIGS. 10 and 11. In the following description, similar or identical components to those in the first embodiment are shown with the same reference signs, and different points will mainly be described. Points which are not particularly described are the same as those in the first embodiment. The present embodiment differs from the first embodiment in that not only the lens distortion but also a lens focal length is a target for calibration.

A hardware configuration of the camera calibration device 100 according to the second embodiment is similar to that according to the first embodiment. In the second embodiment, operations of the internal parameter calibration program 103A stored in the ROM 103 differ.

Figure 10:
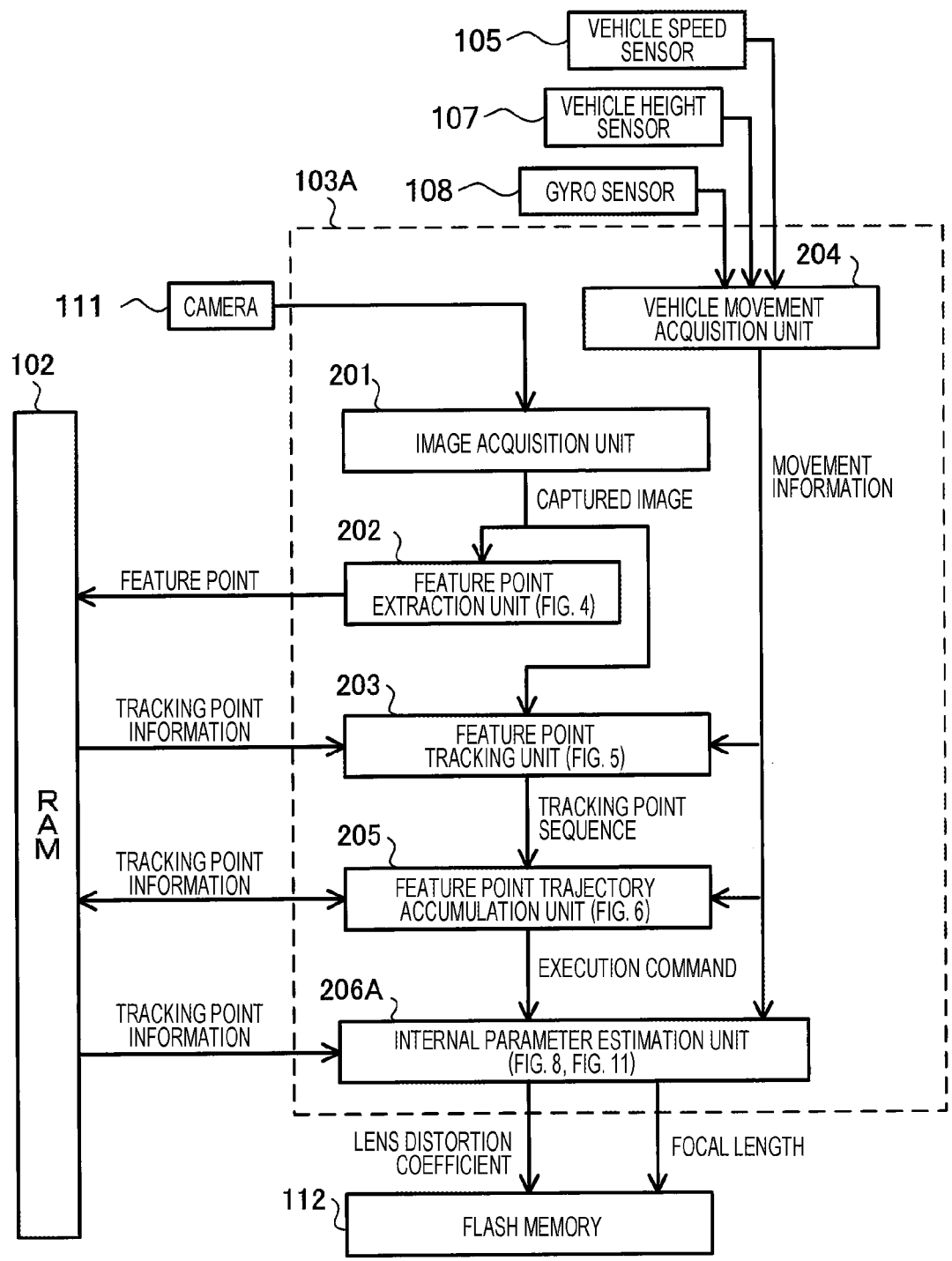
FIG. 10 is a functional block diagram of the internal parameter calibration program in a second embodiment.

FIG. 10 illustrates functional blocks representing functions of the internal parameter calibration program 103A in the second embodiment. An internal parameter estimation unit 206A of the internal parameter calibration program 103A calibrates not only the lens distortion coefficient but also the focal length.

(Calibration for Focal Length)

Figure 11:
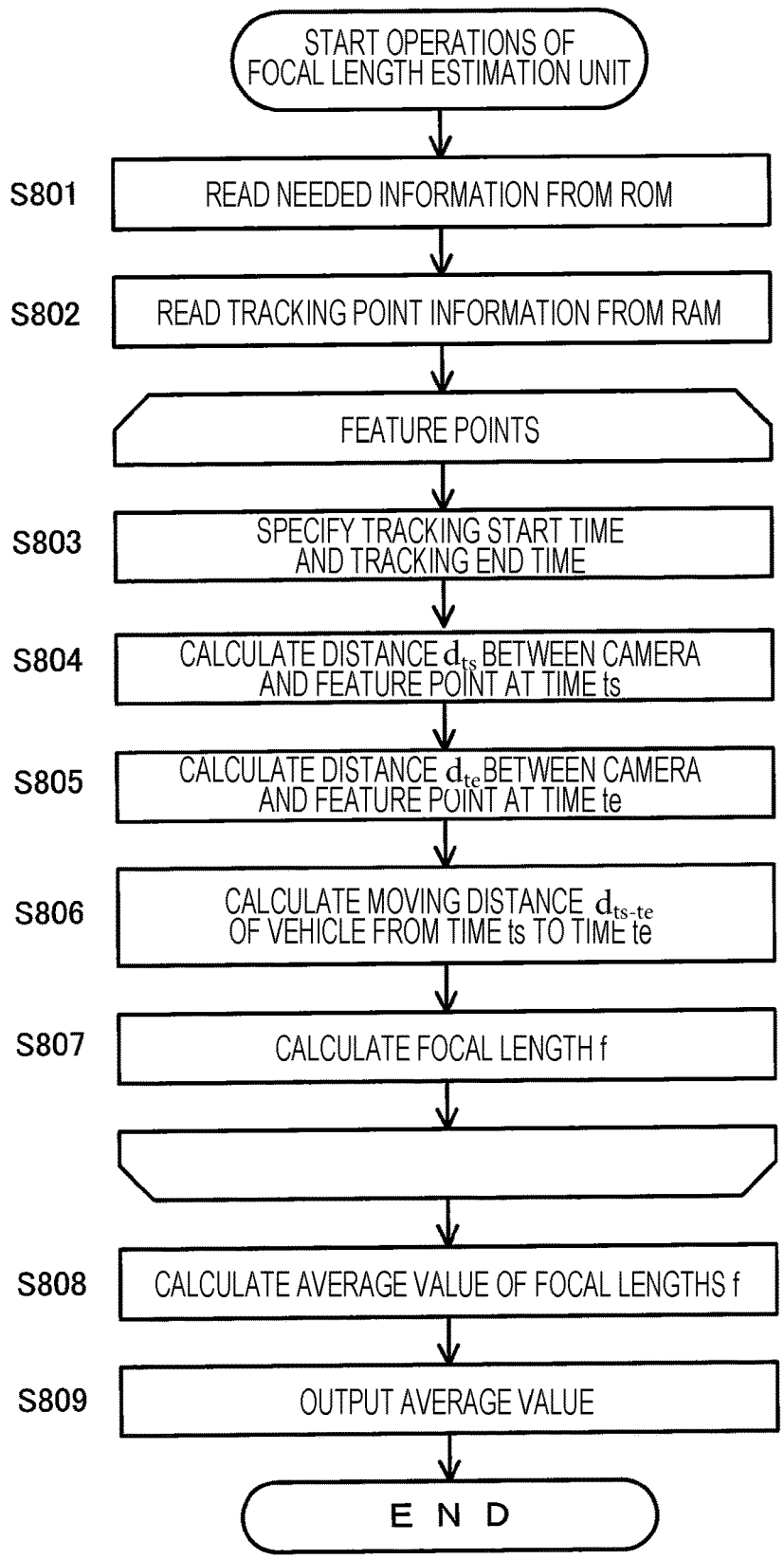
FIG. 11 is a flowchart illustrating operations of a focal length estimation unit in the second embodiment.

FIG. 11 is a flowchart illustrating operations of calibration for the focal length performed by the internal parameter estimation unit 206A.

In step S801, an imaging element size, which is one of the internal parameters of the camera 111, and the external parameters are read from the ROM 103, and the procedure then moves to step S802.

In step S802, the tracking point information 102A is read, and the procedure then moves to step S803.

Steps S803 to S807 described below are executed for each feature point having "OK" in the column "state" of the operation table 102B.

In step S803, capturing time at which tracking of the feature point is started (hereinbelow, time ts) and capturing time at which tracking is ended (hereinbelow, time te) are specified. For example, in a case in which the feature point 1001 is to be processed in the example illustrated in FIG. 3, the capturing time at which tracking is started is "t1", and the capturing time at which tracking is ended is "t3". The procedure then moves to step S804.

In step S804, a distance between the feature point processed and the camera 111 at the time ts specified in step S803 is calculated as a function of a focal length f. Since the imaging element size of the camera 111 is known, a viewing angle of the camera 111 can be expressed with use of the focal length f, and the distance between the feature point processed and the camera 111 can be calculated as a function of the focal length f with use of the known external parameters, that is, the mounting position and the mounting posture of the camera 111 with respect to the vehicle. The distance is hereinbelow referred to as $d_{ts}$. The procedure then moves to step S805.

In step S805, a distance between the feature point processed and the camera 111 at the time te specified in step S803 is calculated as a function of the focal length f. The calculation method is similar to that in step S804. The distance is hereinbelow referred to as $d_{te}$. The procedure then moves to step S806.

In step S806, a straight-line distance the vehicle 1 has moved from the time ts to the time te is calculated with use of the movement information output by the vehicle movement acquisition unit 204. The distance is hereinbelow referred to as $d_{ts-te}$. The procedure then moves to step S807.

In step S807, the focal length f satisfying $d_{ts}-d_{te}=d_{ts-te}$, which is a primary expression of f is obtained, and a calculation result is stored in the RAM 102. In a case in which processing of all of the feature points described in the operation table 102B is completed, the procedure moves to step S808. In a case in which there are feature points for which the processing is not completed, the procedure returns to step S803.

In step S808, an average value of a plurality of focal lengths f stored in the RAM 102 is calculated, and the procedure then moves to step S809.

In step S809, the focal length f calculated in step S808 is stored as the internal parameter in the flash memory 112 to end the flowchart in FIG. 11.

According to the above second embodiment, the following effects can be obtained.

(1) The camera calibration device 100 includes the image acquisition unit 201 into which a plurality of images captured at different times by the camera 111 mounted to the vehicle 1 is input, the feature point extraction unit 202 which extracts feature points from each of the images input into the image acquisition unit 201, the feature point tracking unit 203 which tracks the feature points between the plurality of images, the vehicle movement acquisition unit 204 which acquires information about movement of the vehicle, a trajectory estimation unit (step S703 in FIG. 9) which, based on the information acquired by the vehicle movement acquisition unit 204, estimates a trajectory of the feature points corresponding to the movement of the vehicle 1, and the internal parameter estimation unit 206 which estimates internal parameters of the camera 111, that is, a lens distortion coefficient and a focal length, based on a trajectory of the feature points tracked by the feature point tracking unit 203 and the trajectory of the feature points estimated by the trajectory estimation unit.

Since the camera calibration device 100 is configured as above, feature points are extracted from road signs drawn on the road, and calibration for the lens distortion coefficient and the focal length is performed. In other words, since lines, symbols, and letters drawn on the road are used, calibration for the lens distortion coefficient and the focal length can be performed even without a white line on the road.

(2) The internal parameters include a focal length of a lens included in the camera. The camera calibration device 100 includes a first distance calculation unit (step S804 in FIG. 11) which calculates a first distance $d_{ts}$, which is a distance between a position of the feature point at a first time ts and the camera 111, in accordance with a focal length f, a second distance calculation unit (step S805 in FIG. 11) which calculates a second distance $d_{te}$, which is a distance between a position of the feature point tracked by the feature point tracking unit 203 at a second time te and the camera 111, in accordance with the focal length f, and a moving distance calculation unit (step S806 in FIG. 11) which calculates a moving distance $d_{ts-te}$, which is a distance the vehicle has moved from the first time ts to the second time te based on the information acquired by the vehicle movement acquisition unit 204. An internal parameter estimation unit, that is, the internal parameter estimation unit 206A, calculates the focal length f of the lens included in the camera 111 so that a third distance ($d_{ts}-d_{te}$), which is a difference between the first distance $d_{ts}$ and the second distance $d_{te}$, may be equal to the moving distance $d_{ts-te}$.

Thus, the focal length f can be calculated with use of road signs on a road in addition to a white line.

Meanwhile, in the above second embodiment, the distance between the position of the feature point at the time ts at which tracking of the feature point is started and the camera 111 and the distance between the position of the feature point at the time to at which tracking is ended and the camera 111 are calculated. However, a distance between the position of the feature point at another time and the camera 111 may be calculated to calculate the focal length f.

The aforementioned respective embodiments and modification examples may be combined.

Although various embodiments and modification examples have been described above, the present invention is not limited to the contents of these embodiments and examples. Other conceivable aspects in the scope of the technical idea of the present invention are included in the scope of the present invention.

The disclosure of the following priority basic application is hereby incorporated by reference herein.

Japanese Patent Application No. 2016-18717 (filed on Feb. 3, 2016)

REFERENCE SIGNS LIST 1 vehicle
100 camera calibration device
102A tracking point information
103A internal parameter calibration program
111 camera
112 flash memory
112A internal parameters
201 image acquisition unit
202 feature point extraction unit
203 feature point tracking unit
204 vehicle movement acquisition unit
205 feature point trajectory accumulation unit
206, 206A internal parameter estimation unit

The invention claimed is:

1. A camera calibration device comprising a processor configured to:
   receive a plurality of images captured at different times by a camera mounted to a vehicle;
   extract feature points from each of the plurality of images;
   track the feature points between the plurality of images;
   acquire information about movement of the vehicle;
   estimate, based on the information acquired about movement of the vehicle, a trajectory of the feature points corresponding to the movement of the vehicle;
   estimate an internal parameter of the camera based on at least one trajectory of the tracked feature points and the estimated trajectory of the feature points, wherein the internal parameter includes a lens distortion coefficient in accordance with distortion of a lens included in the camera, wherein a parameter for the distortion of the lens is calculated so that a difference between a trajectory of the feature points into which the trajectory of the tracked feature points has been transformed with use of the lens distortion coefficient and the estimated trajectory of the feature points may be minimum; and
   approximate the trajectory of the tracked feature points with use of a polynomial;
   determine, based on a difference between a coefficient of a polynomial used to approximate a first feature point trajectory and a coefficient of a polynomial used to approximate a second feature point trajectory, whether or not the first feature point trajectory and the second feature point trajectory correspond, wherein the internal parameter of the camera is estimated with use of the first feature point trajectory and the second feature point trajectory which are determined to correspond.

2. The camera calibration device according to claim 1, wherein processor is configured to estimate the internal parameter of the camera in a case in which the trajectories of the tracked feature points are included in all areas into which the image is divided.

3. The camera calibration device according to claim 1, wherein, in a case in which the vehicle is moving straight, the processor is configured to estimate that the trajectory of the feature points is a straight line.

4. The camera calibration device according to claim 1, wherein, in a case in which the vehicle is not moving straight, the processor is configured to estimate the trajectory of the feature points with use of an external parameter of the camera and the information acquired by about movement of the vehicle.

5. The camera calibration device according to claim 1, wherein the processor is configured to determine a region in the image from which the feature points are extracted based on a traveling direction of the vehicle and a capturing direction of the camera with respect to the traveling direction of the vehicle.

6. The camera calibration device according to claim 1, wherein the processor is configured to, with use of a position at which a feature point is extracted in a first image captured at an earlier time out of the plurality of images and the information acquired about movement of the vehicle, determine a region in which the feature point is tracked in a second image captured at a later time than the first image out of the plurality of images.

* * * * *